United States Patent [19]

Walter

[11] Patent Number: 4,969,212

[45] Date of Patent: Nov. 6, 1990

[54] QUANTITATIVE MEASUREMENT OF HANDLING CHARACTERISTICS OF TIRES AND/OR VEHICLE/TIRE COMBINATIONS

[75] Inventor: Steven L. Walter, Akron, Ohio

[73] Assignee: The Goodyear Tire & Rubber Company, Akron, Ohio

[21] Appl. No.: 305,245

[22] Filed: Feb. 1, 1989

[51] Int. Cl.$^5$ ............................................. G06F 15/20
[52] U.S. Cl. ........................... 364/424.03; 364/551.01; 73/146
[58] Field of Search ..................... 364/424.01, 424.03, 364/424.04, 550, 551.01, 424.05; 73/146, 146.4, 146.5

[56] References Cited

U.S. PATENT DOCUMENTS

| | | | |
|---|---|---|---|
| 4,545,240 | 10/1985 | Leiber | 73/146 |
| 4,550,598 | 11/1985 | Breedyk et al. | 73/146 |
| 4,706,979 | 11/1987 | Kawabe | 280/91 |
| 4,773,011 | 9/1988 | Vanhoose | 364/424.03 |
| 4,815,004 | 3/1989 | Beebe | 73/146.3 |

OTHER PUBLICATIONS

R. J. Strange, "Instrumented Objective Tire/Vehicle Handling Testing", pub. No. 820456, SAE Inc., 1982.
Hayes, Koppa, J. White, M. White, "Driver Performance in Closed Loop Tests", pub. No. 750964, SAE Inc., 1975.
"Vehicle Dynamics Terminology SAE J670c", SAE Inc., 1978.
Pacejka, "Tyre Factors and Vehicle Handling", Int. J. of Vehicle Design, 1979.
Hall, "The Influence of Transmission Torques on the Steady State Handling of All Wheel Drive Vehicles, Having One Transverse Differential", I Mech E, 1983.
Curtis, "Handling Analysis and the Weekly Road Tests of Motor" C119/83.
Bernard, Vanderploeg, Shannon, "Linear Analysis of a Vehicle with Four Wheel Steering", pub. No. 880643, SAE, 1988.
Johnson, Davis "RSV Test Monitoring & Data Publication-Results of European Performance and Handling Tests on the Calspan RSV", NATL Technical Information Service, 1979.
The Bendix Corp., "Vehicle Handling", pub. No. 88702, Bendix Research Lab., 1970.
Dixon, "Limit Steady State Vehicle Handling", pub. No., I Mech E, 1987.
Bundorf, "The Influence of Vehicle Design Parameters on Characteristic Speed and Understeer", pub. No. 670078, SAE Inc., 1967.
Kohno, Tsuchiya, Komoda, "On the Vehicle Dynamic Response to the Steering Control—", pub. #690488, SAE, 1969.
Godthelp, Burrij, "Open en Closed Loop Steering in a Lane Change Manoeuvre", TNO Inc., 1983.
Gindy, Ilosvai, "Computer Simulation Study on a Vehicle's Directional Response in Some Severe Manoeures", Vehicle Design, 1983.
Gindy, Ilosvai, "An Experimental Investigation into Vehicle Response During Steering and Braking Manoeuvres", Vehicle Design, 1981.

Primary Examiner—Gary Chin
Attorney, Agent, or Firm—L. R. Drayer

[57] ABSTRACT

A method relating driver perceived control of a vehicle to the quantitative measurements of the handling characteristics of a vehicle/tire combination. The steady-state handling characteristics of a vehicle are obtained by driving the vehicle at substantially negligible tire slippage. These characteristics provided the reference data which can be used to predict the manner in which a vehicle/tire combination will perform under test conditions. The difference between the actual measured response of the vehicle and the predicted response of the vehicle provides the basis for determining if the vehicle was in driver perceived oversteer or driver perceived understeer.

10 Claims, 5 Drawing Sheets

QUANTITATIVE MEASUREMENT OF HANDLING CHARACTERISTICS OF TIRES AND/OR VEHICLE/TIRE COMBINATIONS

BACKGROUND

The present invention relates to a method and a system for quantitative measurement of the handling characteristics of tires and/or vehicle/tire combinations or systems. The present invention is an attempt to relate driver control to vehicle responses under test conditions so that quantitative indications of transient and steady state behaviors are obtained. This is particularly true in regarding driver perceived oversteer and driver perceived understeer behavior. This invention also relates to the quantitative comparison of one vehicle/tire combination with another. This invention also provides a method of correlating a driver's subjective handling ratings of a tire for a particular tire and/or vehicle and the quantitative measured data.

Various methods and techniques have been tried over the years to determine the handling characteristics of vehicles in general and/or tires specifically. One of the most common methods is to have a driver test a vehicle on a test track which subjects the vehicle to a number of different test conditions. The driver may then provide comments and/or subjective rankings concerning performance during braking, cornering, acceleration, wet, rapid maneuvers, etc.

It has therefore been an industry objective over the years to develop a means for testing vehicles, tires, etc., that either eliminates or reduces subjective human differences and relies more on an impartial objective method. Some methods require specific, controlled driven inputs for a single isolated handling test maneuver or for a steady-state maneuver. Some methods attempt to show quantitative results of a particular vehicle response which does not directly relate to a driver's impression of how the vehicle handles. Also various computer models or other models have been developed which represent the handling characteristics of various vehicles or portions of a vehicle including suspensions, tires, etc. These models however are generally limited to steady state handling conditions and have been restricted to the qualitative statement that a vehicle has final understeer or final oversteer characteristics and not to quantitative results.

For example, S.A.E. paper 820456, "Instrumental Objective Tire/Vehicle Handling Testing" by R. J. Strange (1982) sets forth one method of objectively evaluating the handling characteristics of tire/vehicle systems. The method is divided into two portions a steady state and a transient portion. In the steady state portion the speed, Lateral Acceleration and steering wheel angle are measured for constant rate of steer angle while maintaining a constant input speed. From this a ramp steer plot is obtained and an understeer coefficient is calculated which relates to the overall vehicle behavior. The transient conditions are obtained by driving at a constant speed and imparting a step steering input of 140 degrees until the car reaches a steady state attitude. The subjective ratings of the tires by the driver are then compared with the plotted data.

This method alone does not provide analysis and understanding of instantaneous responses of a vehicle/tire system in real world driving situations. For example it does not take into account applied throttle or braking, (acceleration/deceleration) during cornering. The acceleration and deceleration during cornering causes changes in the vehicle/tire handling responses which may cause the driver to make driving corrections. Nor does this method provide for numerous maneuvers such as an "S" curve. In short, the instantaneous actions and responses of the vehicle/tire over any desired test course are not evaluated.

SUMMARY OF THE INVENTION

It therefore is an object of this invention to provide a method for the quantitative measurement and evaluation of handling characteristics of tires and/or vehicle/tire characteristics during dynamic conditions to include both steady state and transient state responses.

It is a further object of the present invention to provide a means for relating driver control of a vehicle/tire system to quantitative indications of vehicle steady and transient state conditions.

It is a further object of the invention to provide a method for quantifying the ability of a vehicle/tire system to follow a driver's inputs in a desirable and predictable manner. It is still further desired to correlate such ability with the driver's subjective ratings.

It is a still further object of this invention to provide a method for obtaining objective measurements of driver perceived understeer and driver perceived oversteer.

An advantage of this invention results in a quantitative characterization of the actual driver perceived understeer and oversteer behavior of a test vehicle as it negotiates a test course or maneuver.

Another advantage of this invention is the detection of differences in the handling performance of one vehicle/tire system from another.

Another advantage of this invention is that it is applicable to almost any set of test conditions, i.e., from a test track, a race track, to everyday driving.

Still another advantage of this invention is the ability to directly relate driver impressions of the vehicle behavior to the measured and calculated quantitative results.

Yet another advantage is the ability to apply statistical analysis to quantitative results to determine the significance of differences which occur. This cannot be done with subjective ratings of one driver alone.

These and other objects and advantages can be accomplished by: (a) measuring vehicle response reference data of a moving vehicle at negligible tire slippage; (b) inputting and storing the vehicle response reference data of step (a) into a computer; (c) driving the vehicle under test conditions and measuring the vehicle response test data; d) inputting and storing the vehicle response test data of step (c) into a computer; (e) determining predicted vehicle response data under test conditions based upon said vehicle response reference data; and (f) comparing the predicted vehicle response data of step (e) with the vehicle response test data to determine driver perceived oversteer and driver perceived understeer.

These and other objects and advantages can be further accomplished by (a) accumulating vehicle response reference data of a vehicle at negligible tire slippage for various angles (steer angles or steering wheel angles) said vehicle response reference data including at least one of the following: Lateral Acceleration and Yaw Velocity; (b) inputting and storing the vehicle response reference data of step (a) into a computer and determining the relationship between the vehicle response reference data and the various angles; (c) accumulating, for a particular set of tires, vehicle response test data of said vehicle driven through a maneuver, series of maneuvers or a course, at various longitudinal velocities, and in excess of the negligible tire slip for at least a portion of said maneuver, series of maneuvers or said course and wherein said vehicle response test data includes at least one of the following: Lateral Acceleration and Yaw Velocity; (d) inputting and storing the data of step (c) into a computer; (e) determining with the aid of said computer and the relationships of step (b), predicted vehicle response reference data, including at least one of the following: predicted Lateral Acceleration and predicted Yaw Velocity for each said test Longitudinal Velocity and angle combination; (f) and comparing said predicted reference data of step (e) to said test data of steps (c) and (d) to determine the O-steer and U-steer of said set of tires.

Another advantage of this invention is the ability to relate driver control of the vehicle to its responses during dynamic conditions.

BRIEF DESCRIPTION OF THE DRAWINGS

The following is a brief description of the drawings in which:

FIGS. 7A-7D are a series of graphs plotted as a function of distance for a test trial. FIG. 7B is the LatA and LongA while

DESCRIPTION OF THE INVENTION

Figure 1:
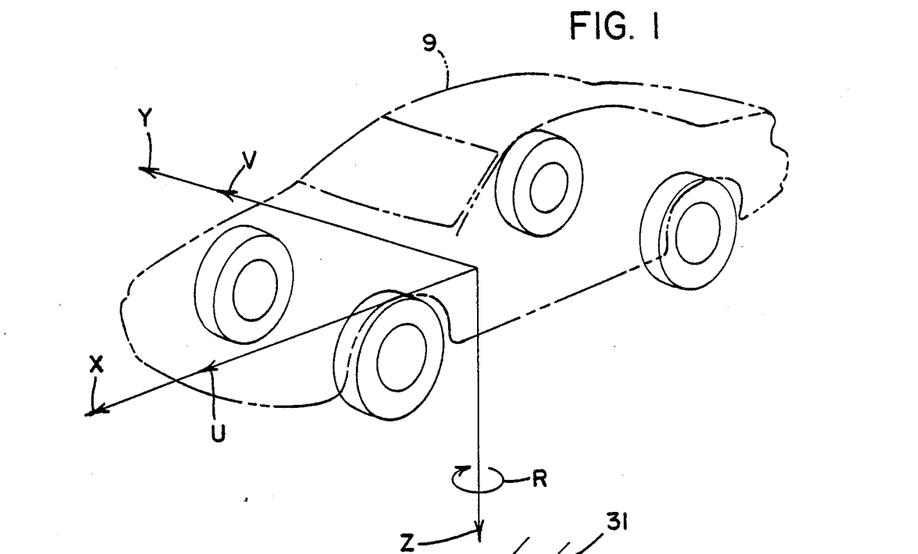
FIG. 1 is a perspective view of a vehicle and its relationship to the Earth-fixed axis system and the vehicle axis system.
Figure 2:
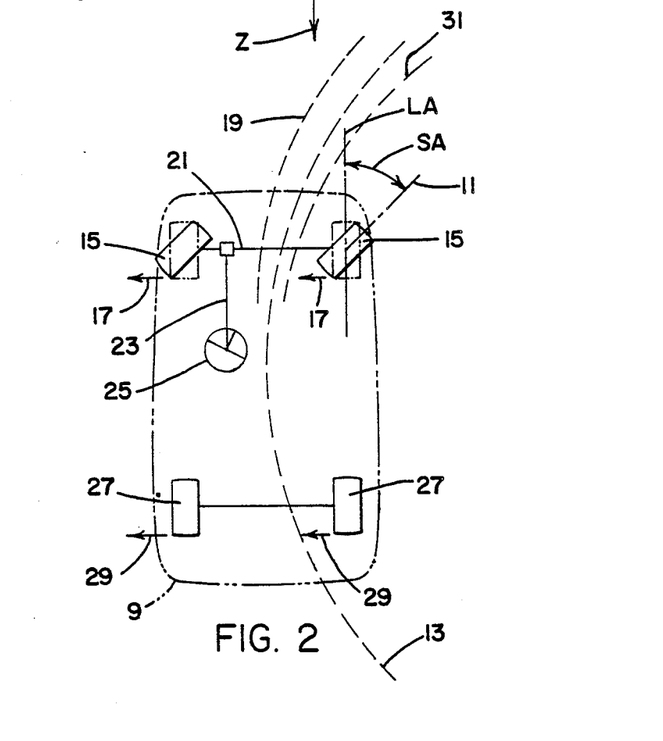
FIG. 2 is a plan view of a vehicle and its wheel relationships during a right hand turn.

Now referring to FIGS. 1 and 2, the following definitions are applicable to this specification, including the claims and conform with S.A.E. "Vehicle Dynamics Terminology (SAE J670e,1978) and wherein:

"Earth-fixed Axis System (X,Y,Z)"—This system is a right-hand orthogonal axis system fixed on the earth. The trajectory of the vehicle 9 is described with respect to this earth-fixed axis system. The X and Y-axis are in a horizontal plane and the Z-axis is directed downward.

"Vehicle Axis System (x,y,z)"—This system is a right-hand orthogonal axis system fixed in a vehicle 9 such that with the vehicle 9 moving steadily in a straight line on a level road, the x-axis is substantially horizontal, points forward, and is in the longitudinal plane of symmetry. The y-axis points to the driver's right and the z-axis points downward.

"Angular Orientation"—the orientation of the vehicle axis system (x,y,z) with respect to the earth-fixed axis system (X,Y,Z) is given by a sequence of three angular rotations. The following sequence of rotations, starting from a condition in which the two sets of axis are initially aligned, is defined to be the standard:

(1) A "yaw rotation", rotation about the aligned z and Z-axis.

(2) A "pitch rotation", rotation about the vehicle y-axis.

(3) A "roll pitch", rotation about the vehicle x-axis.

"Longitudinal Velocity (u)" of a point in the vehicle is the component of the vector velocity in the x-direction.

"Side Velocity (v)" of a point in the vehicle is the component of the vector velocity in the y-direction.

"Forward Velocity" of a point in the vehicle is the component of the vector velocity perpendicular to the y-axis and parallel to the road plane.

"Yaw Velocity (r)"—The angular velocity about the z-axis.

"Longitudinal Acceleration"—The component of the vector acceleration of a point in the vehicle in the x-direction.

"Lateral Acceleration"—The component of the vector acceleration of a point in the vehicle perpendicular to the vehicle x-axis and parallel to the road plane.

"Steering Response"—The vehicle motion resulting from an input to the steering (control) element.

"Steady-State"—Steady-state exists when periodic (or constant) vehicle responses to periodic (or constant) control and/or disturbance inputs do not change over an arbitrarily long time. The motion responses in steady-state are referred to as steady-state responses. This definition does not require the vehicle to be operating in a straight line or on a level road surface. It can also be in a turn of constant radius or on a cambered road surface.

"Transient State"—Transient state exists when the motion responses, the external forces relative to the vehicle, or the control positions are changing with time.

"Trim"—The steady-state (that is, equilibrium) condition of the vehicle with constant input which is used as the reference point for analysis of dynamic vehicle stability and control characteristics.

"Steer Angle (SA)"—The angle between the projection of a longitudinal axis (LA) of the vehicle 9 and the line of intersection 11 of the wheel plane and the road surface. Positive angle is shown in FIG. 2.

"Steering Wheel Angle (SWA)"—Angular displacement of the steering wheel measured from the straight-ahead position (position corresponding to zero average steer angle of a pair of steered wheels).

Figure 3:
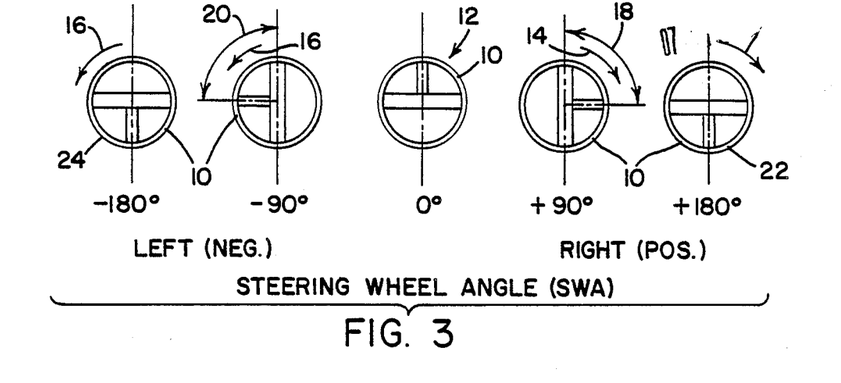
FIG. 3 is a schematic illustrating steering wheel angles.

Referring to FIG. 3 there is illustrated a steering wheel 10 at several positions and its corresponding steering wheel angle SWA. For example, at position 12 the steering wheel is straight and the steering wheel angle SWA is zero degrees. A right turn 14 corresponds to a positive steering wheel angle SWA while a left turn 16 corresponds to a negative steering wheel angle. A quarter of a right turn 18 corresponds to a 90 degree steering wheel angle while a quarter turn to the left 20 corresponds to a −90 degree wheel angle. In like manner a half turn of the wheel right 22 and a half turn of the wheel left 24 corresponds to a 180° and −180° wheel angle respectfully.

The vehicle response reference data is first established for a particular vehicle. The intent is to establish as best as possible the basic handling characteristics of the vehicle regardless of the tires that are being used. This is accomplished by driving the vehicle in a manner that will allow for the collection of data at various steering wheel angles under negligible tire slip conditions. Negligible tire slip as used herein is either zero slip or such slight slippage (usually form 0 degrees to 2 degrees) that the driver does not notice or perceive it. The tire slip angles are negligible, for these purposes under these conditions because the adhesion between the tire and the road is not disturbed but rather only tire carcass deflections occur.

At lower speeds it will be possible to obtain data for a greater range of steering wheel angles than at higher speeds due to the increasing amount of forces working against the tire road surface adhesion. It is desirable to establish or collect the reference data for the speed at which the dynamic test will later be run. For example, if the dynamic test is to be conducted from between 50 and 60 mph the reference data would be gathered at a speed also run in that range. However, as noted above, as the speed of the vehicle increases the range of the steering wheel angle at which reference data can be collected is correspondingly reduced. This in turn reduces the amount of reference data collected. It, therefore, may be more advantageous to collect the reference data at a lower speed where the data may be collected over a wider range. Generally a passenger vehicle driven between 20 and 40 mph provides an adequate range of information.

There are several different manners in which the data may be gathered. One way is to drive the vehicle at a constant speed (Longitudinal Velocity) in a sinusoidal fashion, (slowly moving the steering wheel back and forth). With some pretrial maneuvers the driver can determine how great a steering wheel angle SWA can be used before noticeable tire slippage occurs. The driver then does not exceed this angle while the reference data is collected. In this manner the vehicle will track in a manner indicative of the vehicle's turning radius at each steering wheel angle SWA. As such the data collected is dependent upon the vehicle and not upon the type of tires used.

While the vehicle is being driven in such manner the reference data, Lateral Acceleration (LatA), and Longitudinal Acceleration (LongA); at the particular Longitudinal Velocity (u), are measured and recorded, such as by an on-board computer at the various steering wheel angles SWA. Alternatively the Yaw Velocity (r) may be measured and recorded in place of or in addition to the Lateral Acceleration (LatA). Additionally other various reference data may be collected as desired, such as for example the distance traveled The Lateral Acceleration and the Yaw Velocity may each be compared then as a function of the steering wheel angle in which a mathematical regression may be performed on each combination to establish this relationship. For example the Lateral Acceleration LatA may have a general equation such as $LatA = (u_R) = A_1 \times SWA + \ldots + A_N$; and the Yaw Velocity (r) may have a general equation such as:

$r(u_R) = B_1 \times SWA + \ldots + B_n$; at the specific reference Longitudinal Velocity ($u_R$) where $A_1 \ldots A_N$ and $B_1 \ldots B_n$ are constants and $u_R$ is the particular reference Longitudinal Velocity $u_R$.

Figure 4:
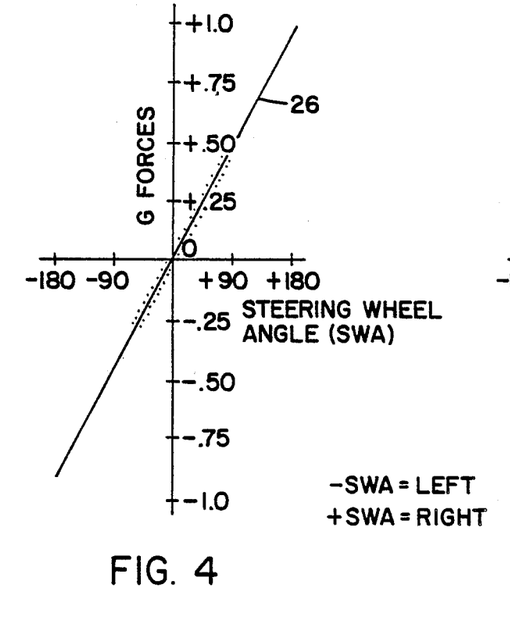
FIG. 4 is a graph illustrating the relationship between the Lateral Acceleration of the vehicle and SWA's at a substantially constant speed.
Figure 5:
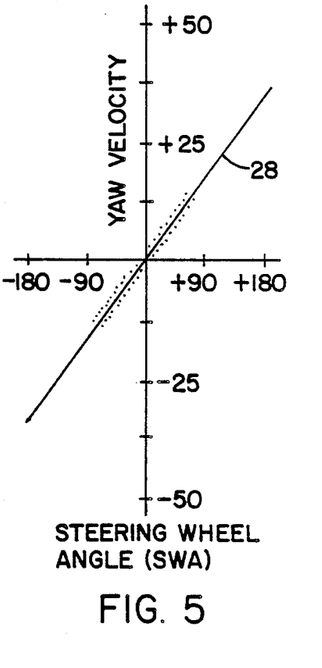
FIG. 5 is a graph illustrating the relationship between Yaw Velocity of a vehicle and SWA's at a substantially constant speed.

In FIGS. 4 and 5 the Reference Lateral Acceleration 26 and the Reference yaw rate 28 respectively for one example has been plotted as a function of the steering wheel angle. In this example the mathematical relationship is linear and the two equations have been reduced to $LatA(u_R) = A_1 \times SWA + A_2$ $r(u) = r(u_R) = B_1 \times SWA + B_2$.

Utilizing these equations it is possible to determine the Lateral Acceleration (LatA) and/or the Yaw Velocity (r) at each Steering Wheel Angle (SWA), measured or not. Thus a dictionary of stored reference data can be obtained.

Once the reference relationships are established these relationships or equations may be used to calculate vehicle response reference data at various corresponding non-measured speeds (longitudinal velocities) and steering wheel angles. This calculated reference data represents how the vehicle is predicted to respond at that particular Longitudinal Velocity and steering wheel angle assuming that the tires maintain adhesion to the road in the manner of the reference test without undergoing any significant changes in suspension and tire geometry Although the suspension and the tires do undergo some geometric changes during severe handling (high steering wheel angles and/or high speeds) these errors may be considered constant for most purposes as used herein.

However, the above equations are only valid at the particular reference Longitudinal Velocity $u_R$. Therefore these equations must be modified to produce results at different longitudinal velocities u under test conditions. This can be accomplished by using the equation of ideal rigid-body motion. Therefore the equation for the Lateral Acceleration for any Longitudinal Velocity becomes:

$LatA(u) = LatA(u_R) \times (u^2/u^2_R)$.

In like manner the Yaw Velocity for any Longitudinal Velocity becomes:

$r(u) = r(u_R) \times (u^2/u^2_R)$.

Therefore once the reference relationships are established, these relationships or equations, are used in subsequent calculations to predict how a vehicle will respond at different instantaneous longitudinal velocities and steering wheel angles Alternatively, if the reference data had been collected over a range of steering wheel steer angles where the Longitudinal Velocity of the vehicle was not constant then the data collected would be speed dependent. Therefore if the vehicle had been driven in sinusoidal manner at various speeds, speed becomes a
in the mathematical regressions utilizing the
ce data. For example the equation for the Lateral Acceleration may become:

$LatA(u) = C_1(SWA \times u) + C_2(SWA \times u^2) + \ldots + C_N$;

while the equation for the Yaw Velocity may become:

$r(u) = D_1(SWA \times u) + \ldots + D_N$.

Aternatively the vehicle may be driven over the test track or race course at negligible tire slip. This may be accomplished at a substantially constant speed or at various speeds as described above. However, it is not necessary to drive in a sinusoidal manner as the course turns should provide such information. In this manner it is advantageous to collect the reference data during the vehicle warm up laps.

Once the reference data has been collected and the mathematical relationships determined the vehicle may then be subjected to a test maneuver, series of maneuvers or run through a test course or the like wherein test data is measured and recorded During the test conditions data will be measured and recorded at various steering wheel angles such as by an on-board computer or other electronic storage means. As a minimum the Lateral Acceleration (LatA) and/or Yaw Velocity (r), the Longitudinal Acceleration (LongA), and the Longitudinal Velocity (u) should be recorded. It is preferred however to also record the brake force, the throttle position, the Yaw Velocity (r) and the distance traveled as some additional data to be measured, but not necessarily limited thereto. Other measurements are possible and may also be useful which would be desirable depending upon the specific application and requirements.

The calculation of or measurement of the distance intervals and the accumulated distance traveled is useful in correlating test data from one test run to another. This is especially important where speed may vary from one test to another. Furthermore, since most of the data gathered is affected by the Longitudinal Velocity or speed of the vehicle it is desirable to arrange the data within a reference frame that is not time and/or speed dependent. This allows the test data from one test run to be compared with that of another.

Normally, it is not possible to average raw data from different test runs or tests as variable as handling tests. This can be done, however, by using distance as a common reference. First a reference set of incremental distance points may be established. This can be done such as at specified increments along the track or in any number of different ways. Once established the data is calculated for each variable of each test run at these reference points. This may be done by liner interpolation between actual data points for an approximation.

Once this has been accomplished the data may be averaged or compared at each reference point. This then allows for statistical analysis to then be performed on such data.

The steering wheel angle (SWA) of the vehicle can be obtained in a number of different manners. It is to be understood that the steer angle (SA) could also be used instead of the steering wheel angle SWA. As such this would effect the reference equations by the mathematical relationship between the steer angle (SA) and the steering wheel angle SWA As such the SWA could be measured from the steering wheel column, for example, by using a rotating potentiometer coupled to a gear on the column. Alternatively the steer angle (SA) could be measured from the movement of the tire rods, such as by the use of a string potentiometer, or some other portion of the steering system. It is generally preferred however to provide the measurement from the steering column.

The lateral and Longitudinal Accelerations may be measured by accelerometers while the Yaw Velocity could be measured by a gyro, all of which are common in the art.

The brake force, as used herein and in the claims, is the force or pressure of the brake system which indicates the degree of brake effort by the driver. This can be measured several ways. One way is to measure the degree or distance of peddle movement or travel. Another way is to measure the brake pressure of the system. This could be accomplished by a pressure transducer at the master cylinder or individual pressure transducers at each individual brake cylinders.

The throttle position, as used herein is the degree of the throttle setting from full open to full closed that is inputted or applied to the car.

The test data is then compared with the reference data (actual or calculated) for each speed/steering wheel angle to determine the difference between the actual vehicle test response versus the predicted responses. The difference between the actual test data and the reference data helps to provide an indication as to if the vehicle is in driver perceived oversteer or "O-steer", or driver perceived understeer or "U-steer" condition. S.A.E. "Vehicle Dynamics Terminology" (SAE J670e,1978) defines both oversteer and understeer in terms of steady state conditions. These definitions provide a description or a tendency that a vehicle has once it has reached steady state. These definitions do not deal with the instantaneous response that the vehicle and/or the tire exhibits during normal driving or driving exhibited on a race course or a test track; nor does it take into account particular maneuvers or circumstances. I have therefore attempted to call these instantaneous responses as driver perceived oversteer or "O-steer" and driver perceived understeer or "U-steer".

For example, referring to FIG. 2, as vehicle 9 proceeds to make a right handed turn along a vehicle path 13 during a test the driver may begin to notice or perceive that the front tires 15 have begun to slip 17 forcing the vehicle along a wider path 19. Normally such slippage is felt as vibrations transmitted from the front tires 15 through the front suspension 21, the steering column 23 and finally the steering wheel 25. In this condition the vehicle is in driver perceived understeer or "U-steer" which requires the driver to turn the steering wheel more to increase the steering angle and guide the car back along the original vehicle path 13. If on the other hand the driver perceives that the rear tires 27 begin to slip 29 forcing the vehicle along a narrower path 31, he will be forced to correct this perceived oversteer by turning back to the left and thereby bringing the car back along the intended vehicle path 13. The perceived oversteer or "O-steer" in contrast to the understeer is felt by vibrations that are transmitted from the rear of the car to the driver through the seat.

Figure 6:
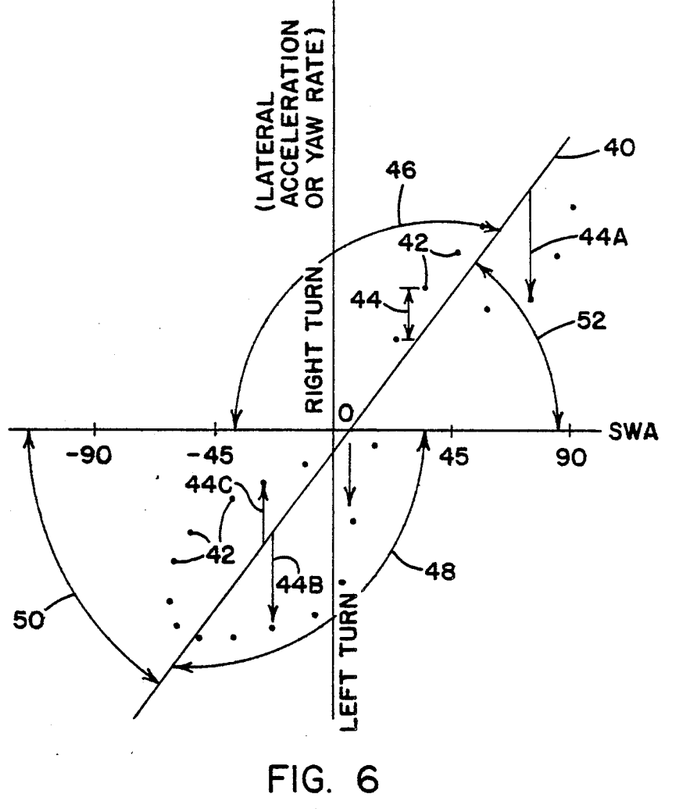
FIG. 6 is a graph illustrating O-steer and U-steer.

Now referring to FIG. 6, there is illustrated a graph 40 of the vehicle response reference data (either Lateral Acceleration or yaw rate) versus the steering wheel angle (SWA) for a particular Longitudinal Velocity (u). The vehicle response test data gathered at the same Longitudinal Velocity (u) as the graph of the reference data 40 is shown generally at 42. In that the plot 40 of the reference data represents no perceived slippage by the driver, points 42 which do not fall or lie on the line 40 indicate tire slippage at that particular steering wheel angle. For a right-turn, or corner (test data points above the steering wheel angle axis), if the value of the test data is greater than 44 the valve of the reference data then the vehicle is considered to be in O-steer to the right, as shown in region 46. Also for a right turn or corner, if the value of the test data is less than 44A the value of the reference data, then the vehicle is considered to be in U-steer to the right, as shown in region 52.

Similarly for a left-turn, or corner (test data points below the SWA area), if the value of the test data is less than 44b the value of the reference data, then the vehicle is considered to be in O-steer to the left, as shown in region 48. Also for a left-turn, if the value of the test data is greater 44C than the value of the reference data, ten the vehicle is considered to be in U-steer to the left, as shown in region 50. The vehicle is considered to be in a neutral state when the value of the test data is equal to the value of the reference data. However, in actual practice slight deviations from the reference data, such as within +5% would be considered to be in the neutral state.

In other words, as used herein U-steer is defined as when the absolute value of the non-steady state vehicle response test data (Lateral Acceleration or Yaw Velocity) of the vehicle is less than the vehicle response (Lateral Acceleration or Yaw Velocity) reference data at the same Longitudinal Velocity and steering wheel angle. Furthermore O-steer as used herein is defined as all other conditions which are neither U-steer or neutral.

The difference between the actual (test) and the reference Lateral Acceleration may be called the Lateral G-Differential or G-Diff and the difference between the actual and the reference Yaw Velocity (r) may be called the Yaw Velocity—differential or r-Diff. These differentials are used to quantify the amount of O-steer and U-steer the vehicle/tire system is exhibiting at each instant of time.

Figure 7A:
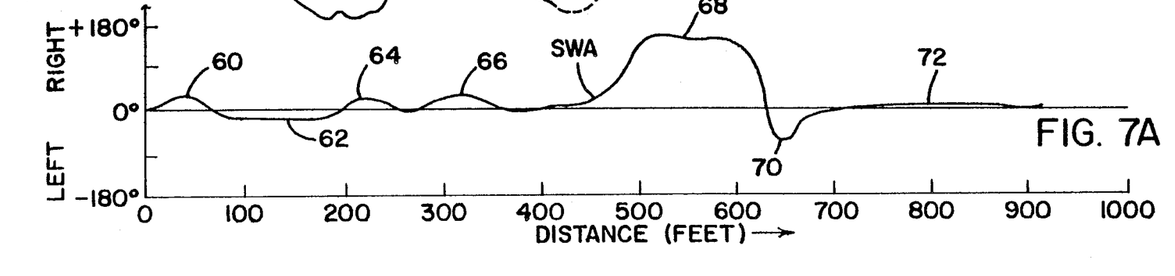
FIG. 7A is the steering wheel angle.
Figure 7B:
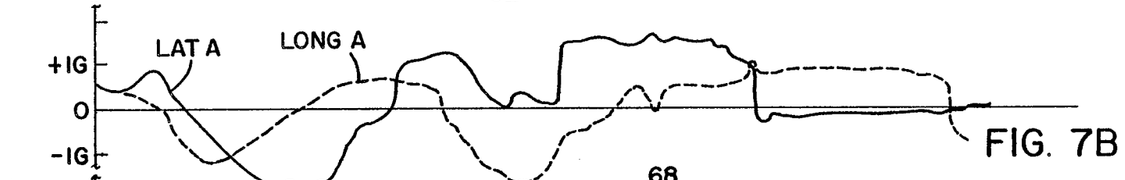
Figures 7C, 7D:
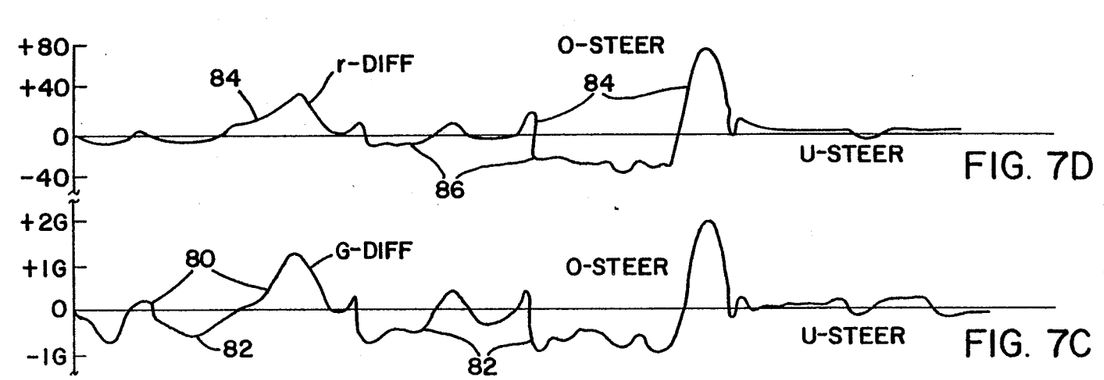
FIGS. 7C and 7D are the G-Diff and r-diff respectfully.

For example referring to FIG. 7 there is a series of graphs plotted as a function of distance for a test trial taken over a race course. The steering wheel angle "SWA" FIG. 7A illustrates that the vehicle begins a right turn 60, then a left turn 62, a series of right turns 64,66,68, a left turn 70 and a straight away portion 72. The measured Lateral Acceleration LatA and Longitudinal Acceleration LongA measured are plotted at the corresponding distances and steering wheel angles, illustrating the forces applied to the vehicle, FIG. 7B. Referring to FIG. 7C the computer compares the actual measured Lateral Acceleration at each data point to the predicted reference Lateral Acceleration data to produce the G-Differential, G-Diff. A positive 80 "G-Differential", (G-Diff), is indicative of an "O-steer" condition. A positive G-Differential results when the test data is in either region 46 or 48 of FIG. 6. A negative 82 G-Differential, G-Diff, on the other hand results when the test data is in either region 50 or region 52 of FIG. 6. A negative G-Diff could also be thought of as the negative resultant of the absolute value of the measured data point less the absolute value of the reference point which indicates a "U-steer" condition. In other words positive values will be assigned to the differences 44 and 44B between the test data and the reference data 40 for O-steer conditions while negative values will be assigned to the differences 44A and 44C between the test data and the reference data 40.

In like manner the Yaw Velocity of the measured data may be compared with the reference data to produce the Yaw Velocity-Differential (r-Diff), FIG. 7D. Again a positive 84 r-Diff is indicative of an "O-steer" condition while a negative 86 r-Diff is indicative of a "U-steer" condition.

FIGS. 7A-7D provide a convenient means for illustrating some of the handling characteristics of the vehicle/tire system as it underwent one particular test condition; thereby providing for the qualification of such.

Figure 8A:
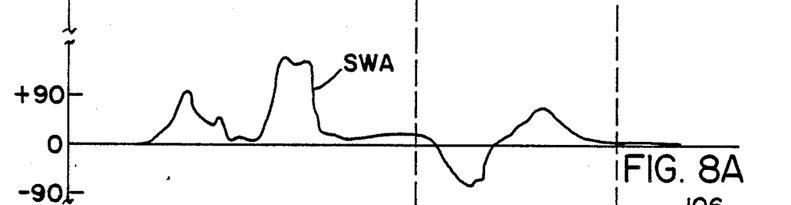
FIGS. 8A-8D are a series of graphs plotted as a function of distance for another test trial.
Figure 8B:
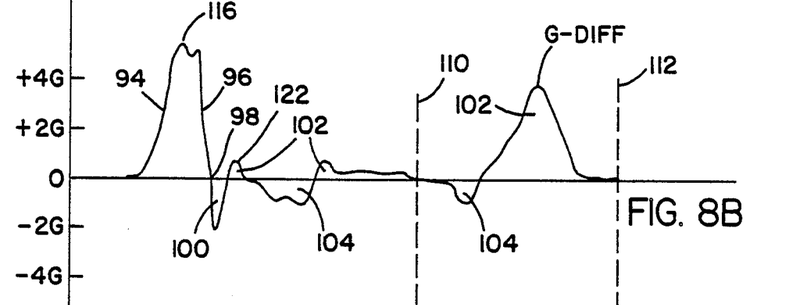
Figure 8C:
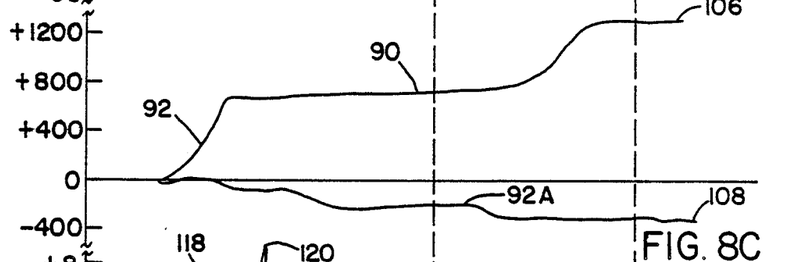

The data collected can be further manipulated to further analyze the performance of the vehicle/tire system. For example, referring to FIG. 8 there is illustrated a series of graphs plotted as a function of distance for another test trial. FIG. 8A illustrates the steering wheel angle SWA plotted versus distance, while FIG. 8B illustrates the G-Differential (G-Diff). In order to quantify the degree of O-steer and U-steer the area under the curve is determined to produce a final numerical number. In FIG. 8C the accumulated O-steer 90 and the accumulated U-steer 92 are plotted as a function of distance. The accumulated O-steer 90 starts at zero, 91, and increases 92 as the amount of positive G-Diff is incrementally added (the G-Diff is first increasing at 94 and then is decreasing 96 until it reaches zero at 98). The accumulated U-steer 92 remains zero until the G-Diff becomes negative 100, wherein the negative area is then incrementally accumulated. Each subsequent positive portion 102 of the G-Diff is then incrementally added to the accumulated O-steer 90 as are the subsequent negative areas 104 of the G-Diff added to the accumulated U-steer 92. The final value of the O-steer 106 and the final value of U-steer 108 provides a means for ranking the performance of one set of tires versus another. Vehicle/tire systems tested in substantially the same manner and which receive a lower (closer to zero) overall final value would indicate a better O-steer performance while a higher (farther away from zero) O-steer would indicate a worse performance. In like manner the U-steer could be compared, however, since the U-steer has been expressed as a negative number the larger the number the better the performance. In other words the closer the O-steer or U-steer approaches zero the better it is. Alternately only a portion of the test may be compared as opposed to the total. For example it may be determined to compare only the data between lines 110 to 112 with other subsequent vehicle/tire systems.

Figure 8D:
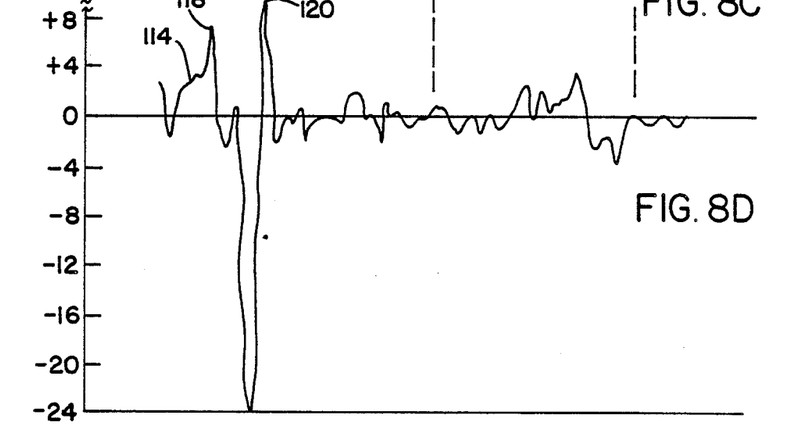

The rate of change of the G-Diff plot produces a G-Diff Gradient, shown generally at 114 of FIG. 8D. The G-Diff Gradient illustrates how quickly the O-steer/U-steer condition occurred. In regard to O-steer it is important to compare large values of O-steer coupled with a peak of the G-Diff Gradient. This corresponds to how rapidly the driver perceived this condition to occur. For example, the peak 116 of the G-Diff coupled with the peak 118 of the G-Diff Gradient is an indication of a significant O-steer condition which required the driver to make a quick correction. The peak 120 of the Gradient 114 is of minor importance in that the corresponding peak 122 of the G-Diff is small in comparison to 116. The peak 120 in this instance is a result of an over correction of the O-steer condition associated with peaks 116 and 118.

To further compare the recorded data to the driver's perception it is possible to provide a tape recorder for recording his comments as the car is driven along the test course. The driver's comments can then be compared with the generated data for comparison. For example, from the driver's comments it may be indicated that the car is experiencing a large amount of O-steer. Comparing his comments at that particular portion of the test it may be determined which portions of the G-Diff, such as peak 116 of FIG. 8B, corresponds to this reaction. This allows for the comparison with other data or graphs (such as G-Diff gradient, FIG. 8D) in order to determine the magnitude and extent of the instantaneous experience of the driver.

In instances where the throttle and brake have been used in a significant manner during a test procedure it has been found to be beneficial to categorize data per these variables. The test data may be categorized according to the degree of throttle application or by the degree of brake application by the driver. Numerical methods and/or color graphics can then be used on these categories of data to provide a greater degree of insight to their interactions. For example, it has been beneficial to compare the G-diff and/or the r-diff when the percentage of throttle has been greater than 10% and where the Lateral Acceleration is greater than 0.5G.

Other variables or areas may also be compared in a similar manner as O-steer and U-steer to produce a numerical ranking for that particular area. This includes grip results, slippage, etc. However, the O-steer and U-steer results provide a good quantitative measurement and relationship of results.

The above test procedure could then be repeated for different sets of tires. One set of tires could be compared to another, utilizing the final numeral rating of the O-steer and U-steer results, and ranked accordingly. Alternatively another part of the vehicle could be changed, such as springs, suspension systems, etc., and this effect on handling could be compared. It should be noted that the reference data would generally not have to be gathered again because this data should remain constant as the reference for any subsequent changes to the vehicle/tire system. The reference data, however, may be required to be checked or gathered at a later time as the characteristics of the car changes over time. For example, as the car ages there may develop more slop in the steering as the suspension system, tie rods, etc., become looser with wear and tear.

If the car is driven substantially the same for each test by the driver, the test results should indicate the differences between the changes made fairly accurately without the introduction of substantial error. For example if the vehicle is driven in substantially the same manner using tires of a different construction than the tires of the first test, the difference in performance should be a result of the difference in the tires as opposed to how the driver performed the maneuvers.

The numerical ratings and rankings can also be compared with the driver's subjective numerical ratings. For example, referring to Table 1 there is illustrated the U-steer and O-steer ratings for three sets of different tires. For the driver's rating (scale from 0 to 10) the higher the rating the better For the data ratings the lower the number the better The data ratings have been scaled by assigning a value of 100 to set 1, the control set. The overall final numerical rating of the set 1 tire for U-steer was then divided into the final numerical rating of sets 2 and 3 and then multiplied by 100 to produce a percentage.

The results indicated that the tires were ranked each in the same order by both the driver and the data obtained. Furthermore both the calculated data and the driver rating show that the second set of tires was significantly better, both U-steer and O-steer, than the tires of the third set.

|  | U-Steer Rating | | | O-Steer Rating | | |
| --- | --- | --- | --- | --- | --- | --- |
|  | Driver | Calc. Data | Rank | Driver | Calc. Data | Rank |
| Set 1 | 5.0 | 100 | 2 | 5.0 | 100 | 2 |
| Set 2 | 6.0 | 49 | 1 | 5.5 | 82 | 1 |
| Set 3 | 4.5 | 119 | 3 | 4.0 | 161 | 3 |

Also the above procedure provides a basis for determining the handling responses over various road surfaces. For example the reference data could be gathered on a clean dry road surface. One test could be run on the dry road surface with subsequent ones on different road surfaces such as wet, snow, etc., and the results compared for the same tires. Furthermore, different sets of tires could be compared on a variety of road surfaces to thereby determine the handling characteristics and the rankings on wet, dry, snow, etc., conditions.

Comparing the test results of a tire to the predicted results may indicate areas in which the tire needs improvement. Construction modifications can then be performed, such as changing a tread compound, and the results of that test compared to the results of the previous test. In such a manner changes in construction of a tire can be compared to the corresponding changes produced in driver perceived under or oversteer.

While certain representative embodiments and details have been shown for the purpose of illustrating the invention, it will be apparent to those skilled in this art that various changes and modifications may be made therein without departing from the scope of the invention.

What is claimed is:

1. A method of determining the handling characteristics of tires comprising the steps of:
   (a) accumulating vehicle response reference data of a vehicle at negligible tire slippage for either steer angles or steering wheel angles, said vehicle response reference data including at least one of the lateral acceleration and yaw velocity;
   (b) inputting and storing the vehicle response reference data of step (a) into a computer and determining the relationship between the vehicle response reference data and either the steer angles or steering wheel angles;
   (c) accumulating, for a particular set of tires, vehicle response test data of said vehicle driven through a maneuver, series of maneuvers or a course, at various longitudinal velocities, and in excess of the negligible tire slip for at least a portion of said maneuver, series of maneuvers or said course and wherein said vehicle response test data includes at least one of said lateral acceleration and said yaw velocity;
   (d) inputting and storing the data of step (c) into a computer;
   (e) determining with the aid of said computer and the relationship of step (b) predicted vehicle response reference data, including at least one of the predicted lateral acceleration and predicted longitudinal velocity; and
   (f) comparing said predicted reference data of step (e) to said test data of steps (c) and (d) to determine the O-steer and U-steer of said set of tires.

2. The method of claim 1 further comprising the steps of
   (g) repeating steps (c) through (f) for a different set of tires;
   (h) determining the accumulated amount of O-steer and U-steer for each set of tires;
   (i) ranking one set of tires better than the other based on the degree of said determined O-steer; and
   (j) ranking one set of tires better than the other based on the degree of said determined U-steer.

3. The method of claim 2 wherein the vehicle is driven in a sinusoidal manner during the step of accumulating said vehicle response reference data.

4. The method of claim 2 wherein the vehicle is driven around a test or race track during the step of accumulating said vehicle response reference data.

5. The method of claim 2 wherein the vehicle is driven at a substantially constant speed during the step of accumulating said vehicle response reference data.

6. The method of claim 4 wherein the vehicle is driven at various different Longitudinal Velocities during the step of accumulating said vehicle response reference data.

7. The method of claim 2 wherein said step (f) comprises the step of determining G-diff, wherein the magnitude of G-diff is defined by the absolute value of the following equation:

$$G-diff = pre\ LatA - test\ LatA$$

wherein pre LatA is the predicted Lateral Acceleration, test LatA is the test Lateral Acceleration and wherein a positive G-Diff is indicative of a O-steer condition and a negative G-Diff is indicative of a U-steer condition.

8. The method of claim 7 wherein the accumulation of O-steer of each step (h) includes the summation of the positive G-Diff and the accumulation of the amount of U-steer of said step (h) includes the summation of the negative G-Diff.

9. The method of claim 7 further comprising the steps of determining the G-diff gradient.

10. The method of claim 2 wherein said step (f) comprises the step of determining r-diff, wherein the magnitude of r-diff is defined by the absolute value of the following equation:

$$r-diff = pre\ Yaw\ (r) - test\ Yaw\ (r)$$

wherein pre Yaw (r) is the predicted Yaw Velocity, test Yaw (r) is the test Yaw (r) and wherein a positive Yaw (r) is indicative of an O-steer condition and a negative Yaw (r) is indicative of a U-steer condition; and further comprising the step of determining the r-diff gradient.

* * * * *